(12) United States Patent
Chen et al.

(10) Patent No.: US 6,385,631 B1
(45) Date of Patent: May 7, 2002

(54) PRIORITY ENCODER

(75) Inventors: Feng Chen; Thomas D. Fletcher, both of Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/176,618

(22) Filed: Oct. 21, 1998

(51) Int. Cl.[7] .................................................. G06F 7/00
(52) U.S. Cl. ....................................................... 708/211
(58) Field of Search ........................ 708/211; 326/113, 326/106; 710/244; 341/160

(56) References Cited

U.S. PATENT DOCUMENTS 4,541,067 A * 9/1985 Whitaker ..................... 326/113
5,602,545 A * 2/1997 Ishii et al. ..................... 341/50
5,808,483 A * 9/1998 Sako ........................... 326/113

OTHER PUBLICATIONS

Takayasu Sakurai et al, "Low–Power CMOS Design through VTH Control and Low–Swing Circuits," International Symposium on Low Power Electronics and Design, Association for International Synoposium on Low Power Electronics and Design, Association for Computing Machinery and Special Interest Group on Design Automation, Monterey California, pp. 1–6 (1997).

* cited by examiner

*Primary Examiner*—Chuong Dinh Ngo
(74) *Attorney, Agent, or Firm*—Seth Z. Kalson

(57) ABSTRACT

A low voltage swing priority encoder comprising pass cells to provide differential voltages indicative of the leading one of a binary tuple. A tree structure with bypass paths allows for the minimization of the number of pass cells in a signal propagation path so as to reduce signal delay. The pass cells are responsive to control voltages indicative of various Boolean functions of the binary tuple, and a pulse voltage signal is applied to the pass cells. In response to the control voltages and the pulse voltage signal, the pass cells provide differential voltages so that voltage swing of the differential voltages are kept below the supply voltage to reduce dynamic power dissipation. Sense amplifiers sense the differential voltages to provide the final logic level indicative of the leading one of the binary tuple.

25 Claims, 13 Drawing Sheets

PRIORITY ENCODER

FIELD

The present invention relates to circuits, and more particularly, to priority encoder circuits.

BACKGROUND

Priority encoders provide output voltages indicative of the position of the leading one or zero in a binary tuple, and are used in many different types of circuits for many different applications. For high speed, low power circuits, there is a need to provide for priority encoders with low power-delay products.

An example of a priority encoder at the logic gate level using AND gates is illustrated in FIG. 1. The priority encoder of FIG. 1 provides the position of the leading one in a six-bit binary tuple B=(B[0], B[1], B[2], B[3], B[4], B[5]), where B[i]=1 denotes a HIGH voltage and B[i]=0 denotes a LOW voltage. The output voltages are labeled $E_i$, i=0, 1, ... 5, where only at most one $E_i$ is HIGH to indicate the position of the leading one in the six-bit binary tuple B.

For high speed circuits, logic gates with large fan-in are generally to be avoided, for otherwise the signal propagation delay in the circuit may be too large. In the particular example of FIG. 1, the fan-in is limited to four. For a six-bit priority encoder, this fan-in limitation is not necessarily a problem, for only two levels of AND gates are utilized in FIG. 1. However, extending the circuit structure of FIG. 1 to an n-bit priority encoder, and maintaining the fan-in limitation to four, would require $\lfloor n/4 \rfloor + 1$ levels of AND gates, where $\lfloor x \rfloor$ for some x denotes the largest integer less than or equal to x. For example, for a 32-bit priority encoder, there would be nine levels of AND gates in a circuit structure similar to that of FIG. 1. Too many logic gate levels may lead to unacceptable signal propagation delays in high speed circuits.

Another problem for high speed circuits may be power dissipation. Dynamic power dissipation for a gate may be approximated as $p_r C_L V_s V_{DD} f_{clk}$, where the variables are respectively, in left-to-right order, switching probability, load capacitance, voltage swing of a signal, supply voltage, and clock frequency. For the circuit of FIG. 1, the voltage swing is also the supply voltage, so that $V_s = V_{DD}$. For the case of $V_s = V_{DD}$, and for a given clock frequency, load capacitance, and switching probability, the dynamic power dissipation may be reduced by reducing the supply voltage. However, signal propagation delay is approximately inversely proportional to supply voltage, so that reducing the supply voltage may lead to unacceptable signal propagation delay.

In low voltage swing circuits, the voltage swing $V_s$ is less than the supply voltage $V_{DD}$. Low voltage swing circuits may be one promising way to reduce power dissipation in high speed circuits. Consequently, it is useful to provide a priority encoder with a circuit structure for which low voltage swings may be utilized and for which signal propagation paths are not unacceptably large.

DETAILED DESCRIPTION OF EMBODIMENTS

Figure 1:
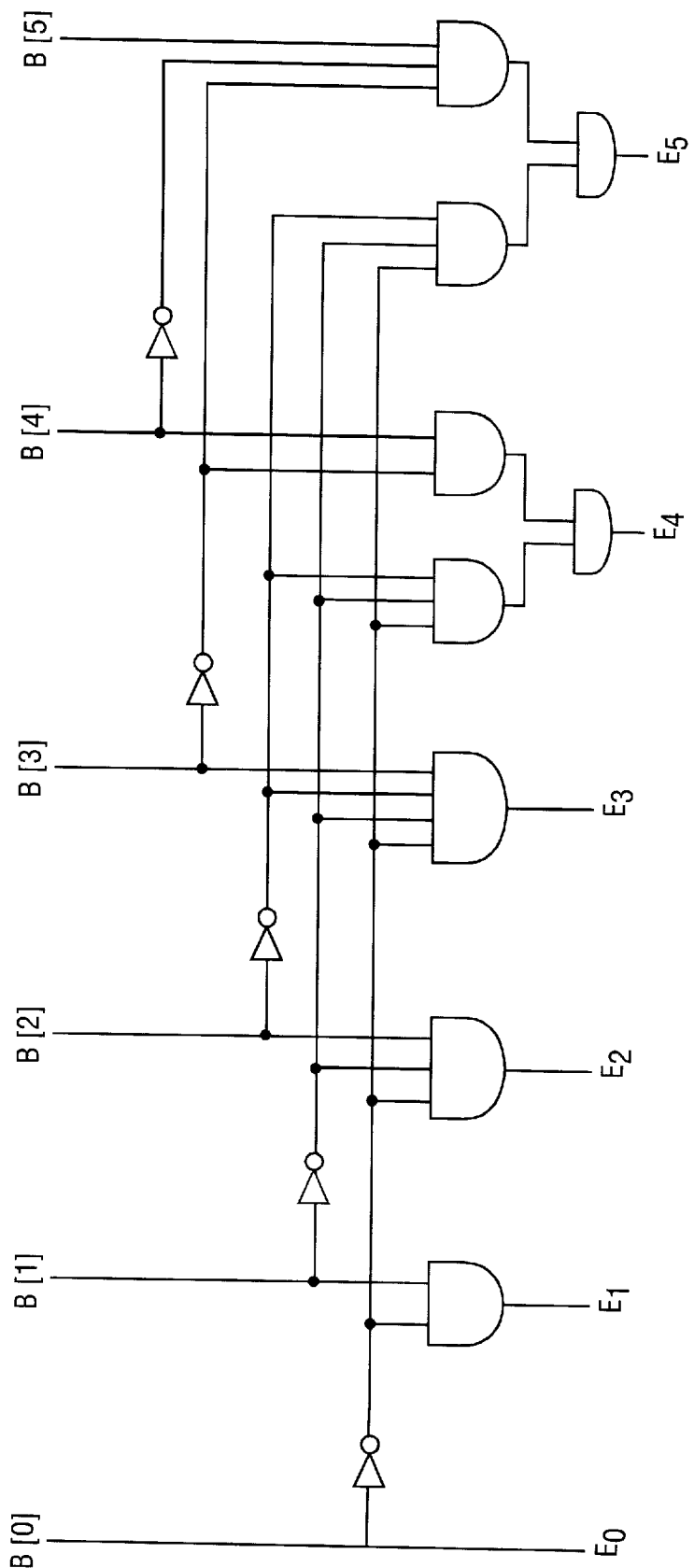
FIG. 1 is a prior art priority encoder.
Figure 2A:
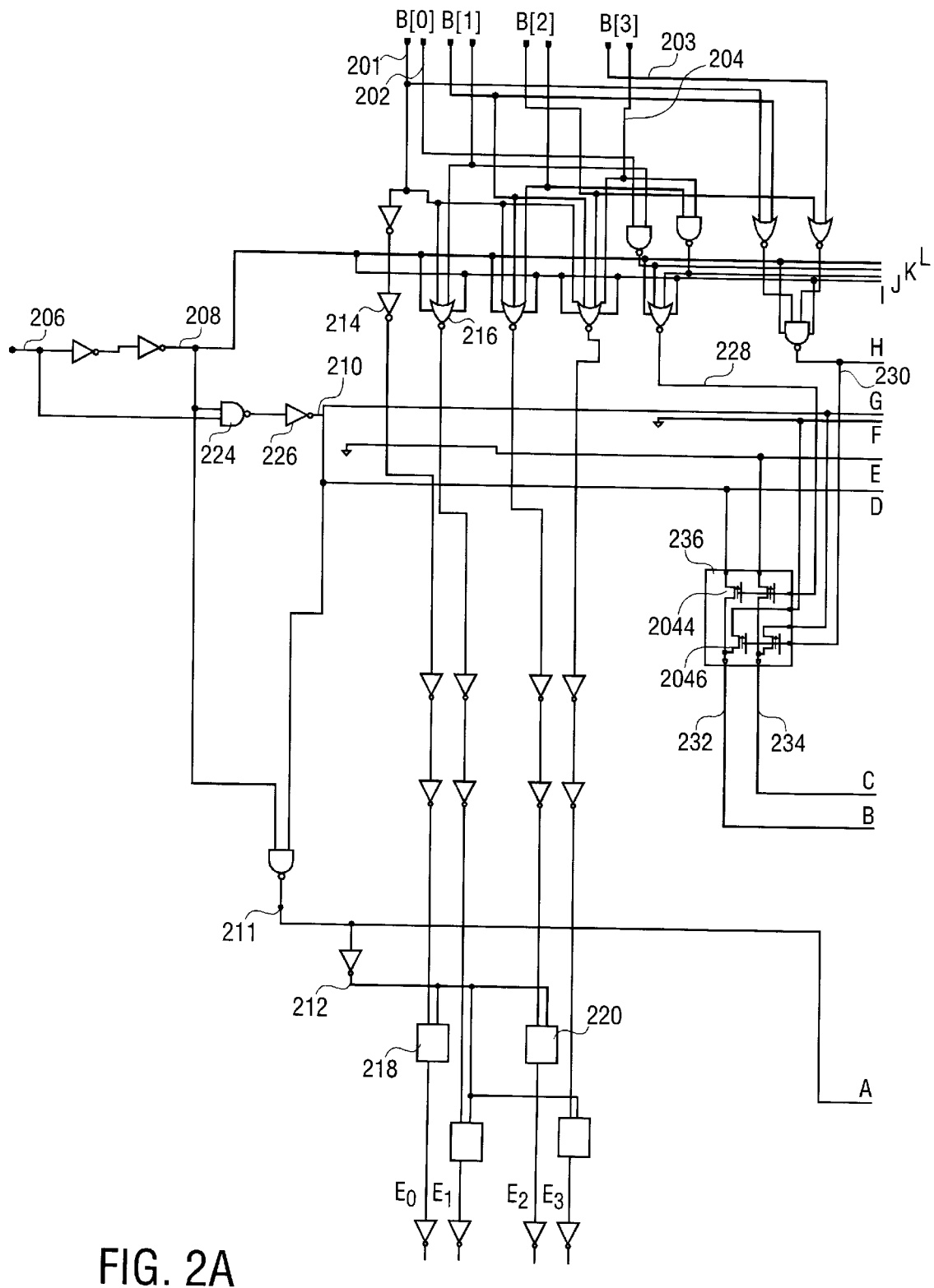
FIGS. 2a-h comprise a circuit schematic of an embodiment priority encoder.
Figure 2B:
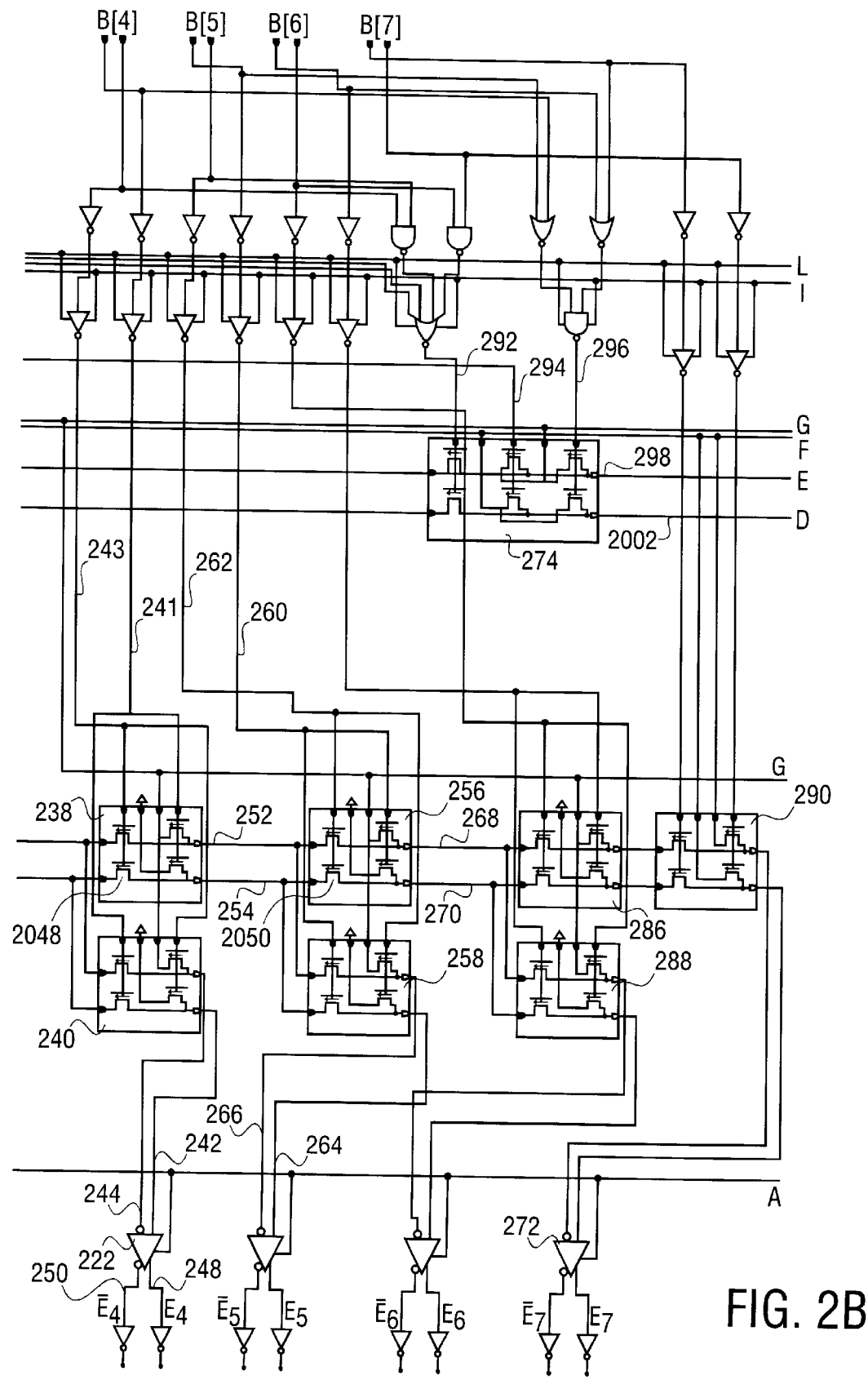
Figure 2C:
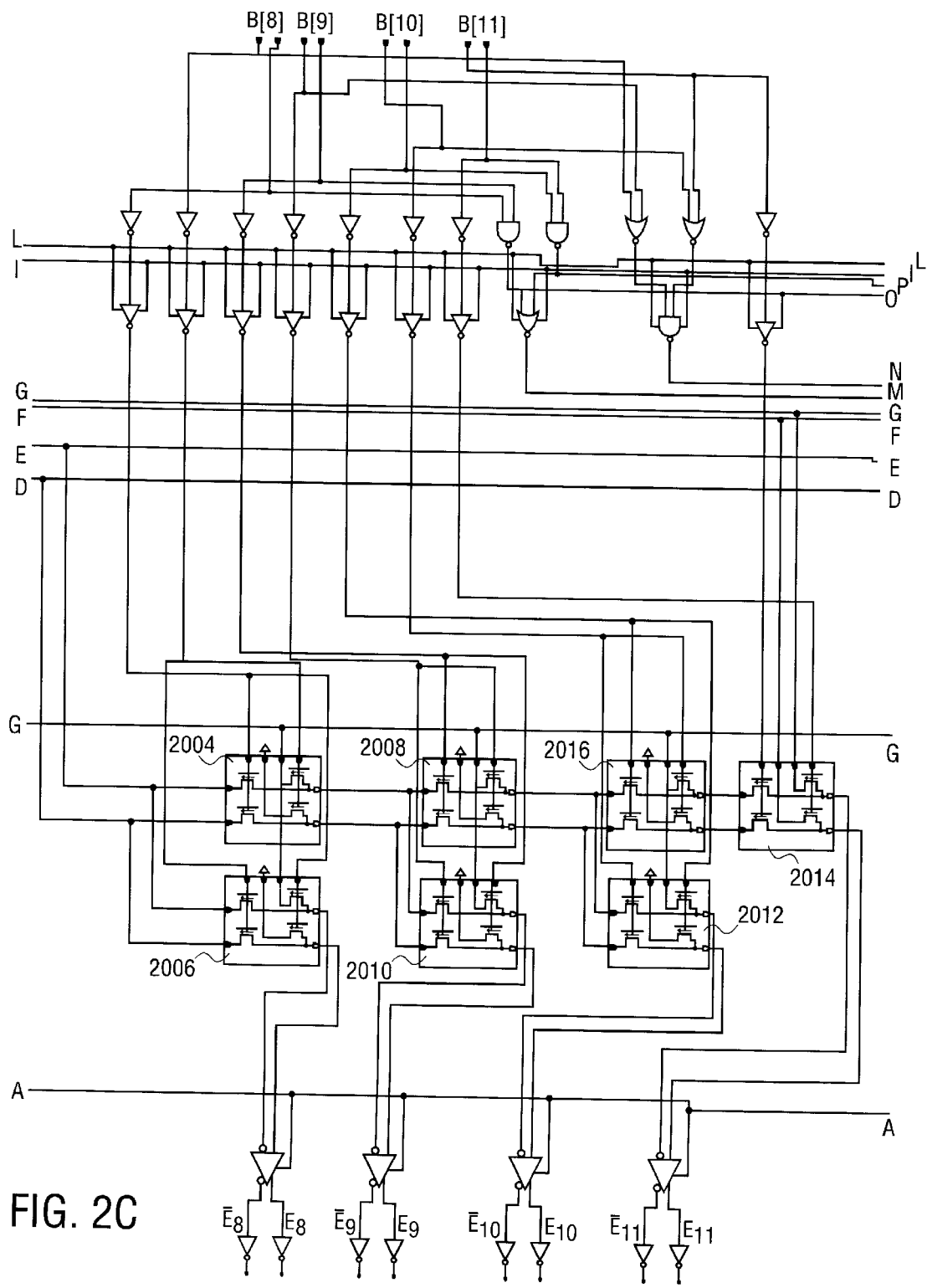
Figure 2D:
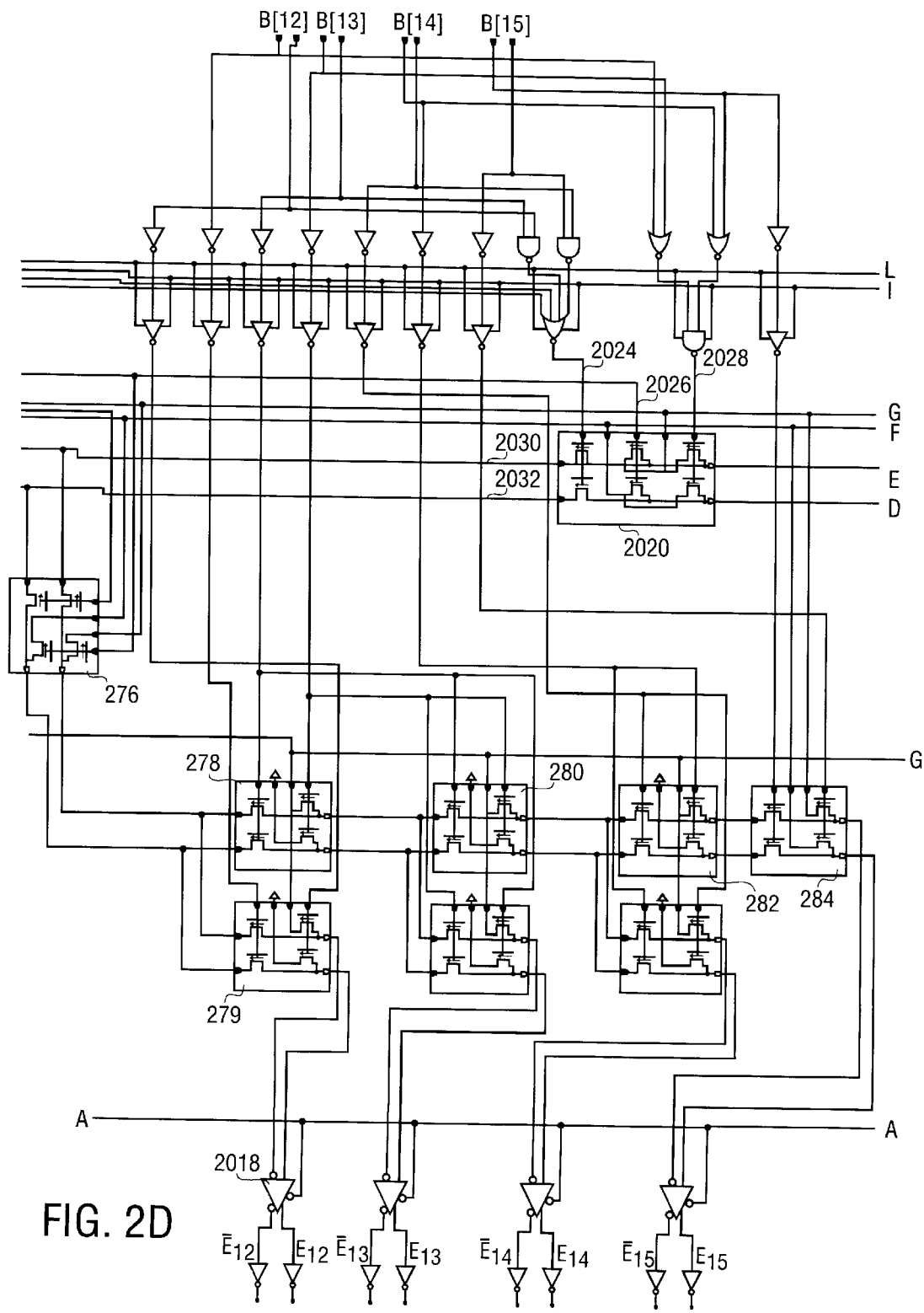
Figure 2E:
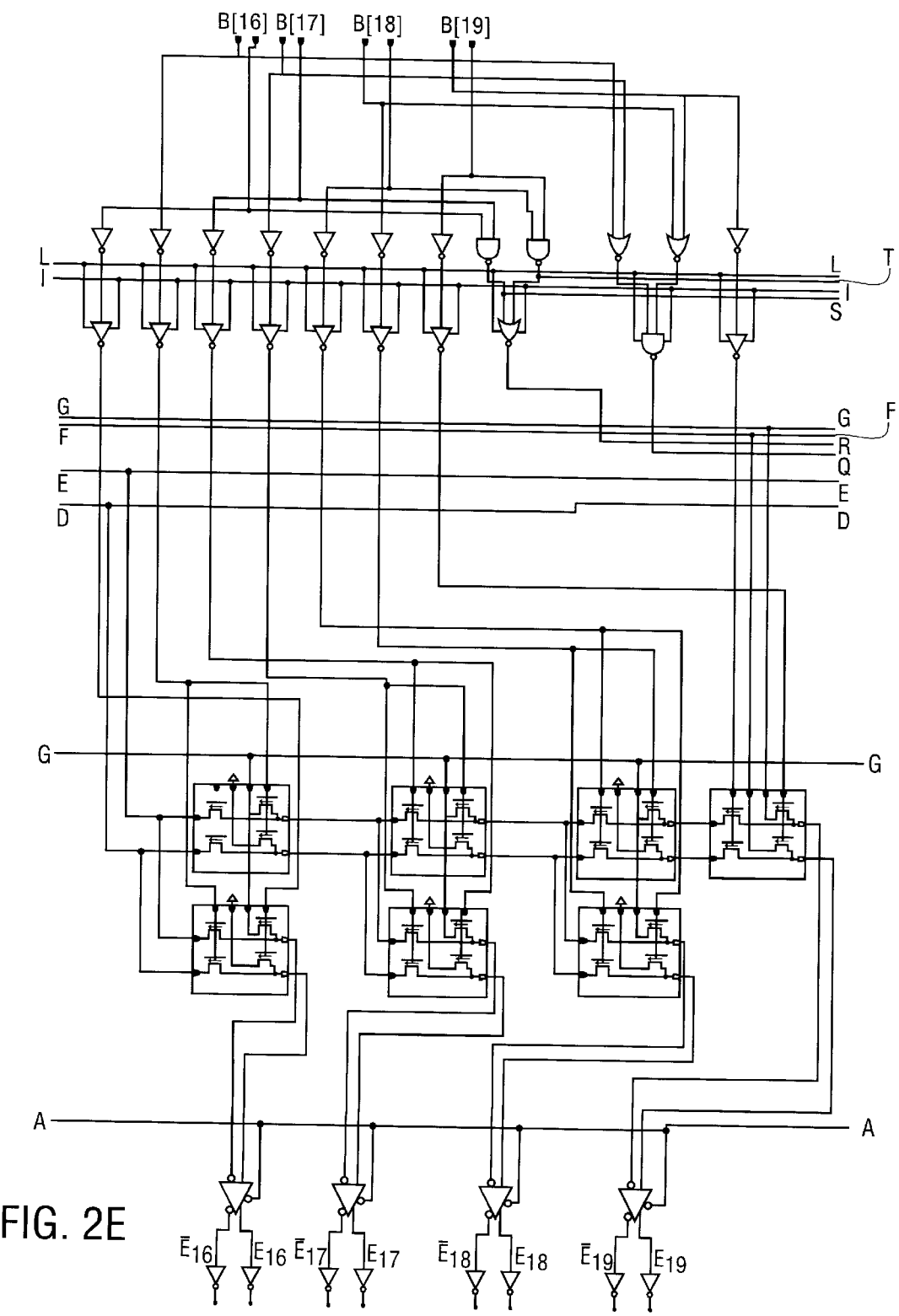
Figure 2F:
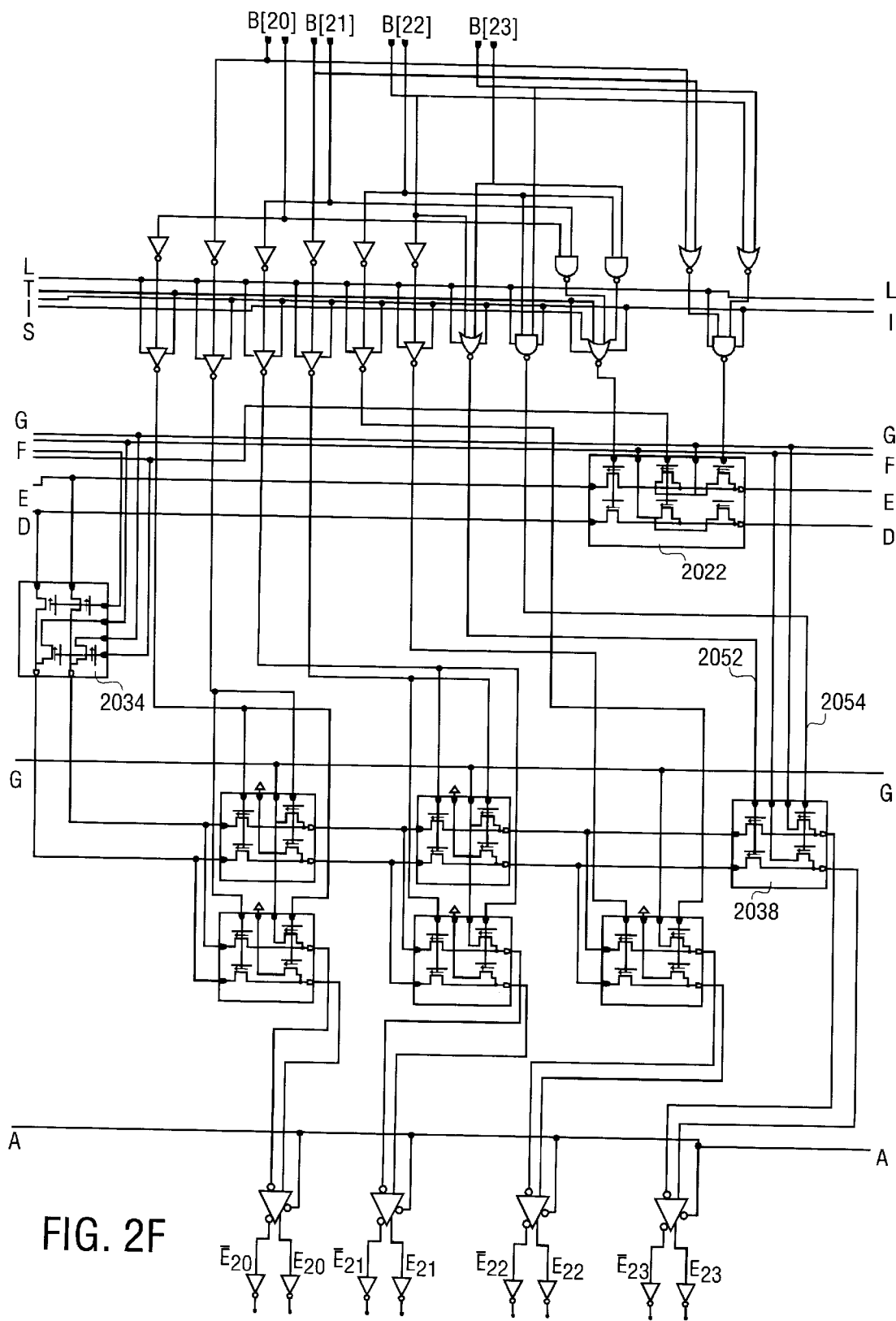
Figure 2G:
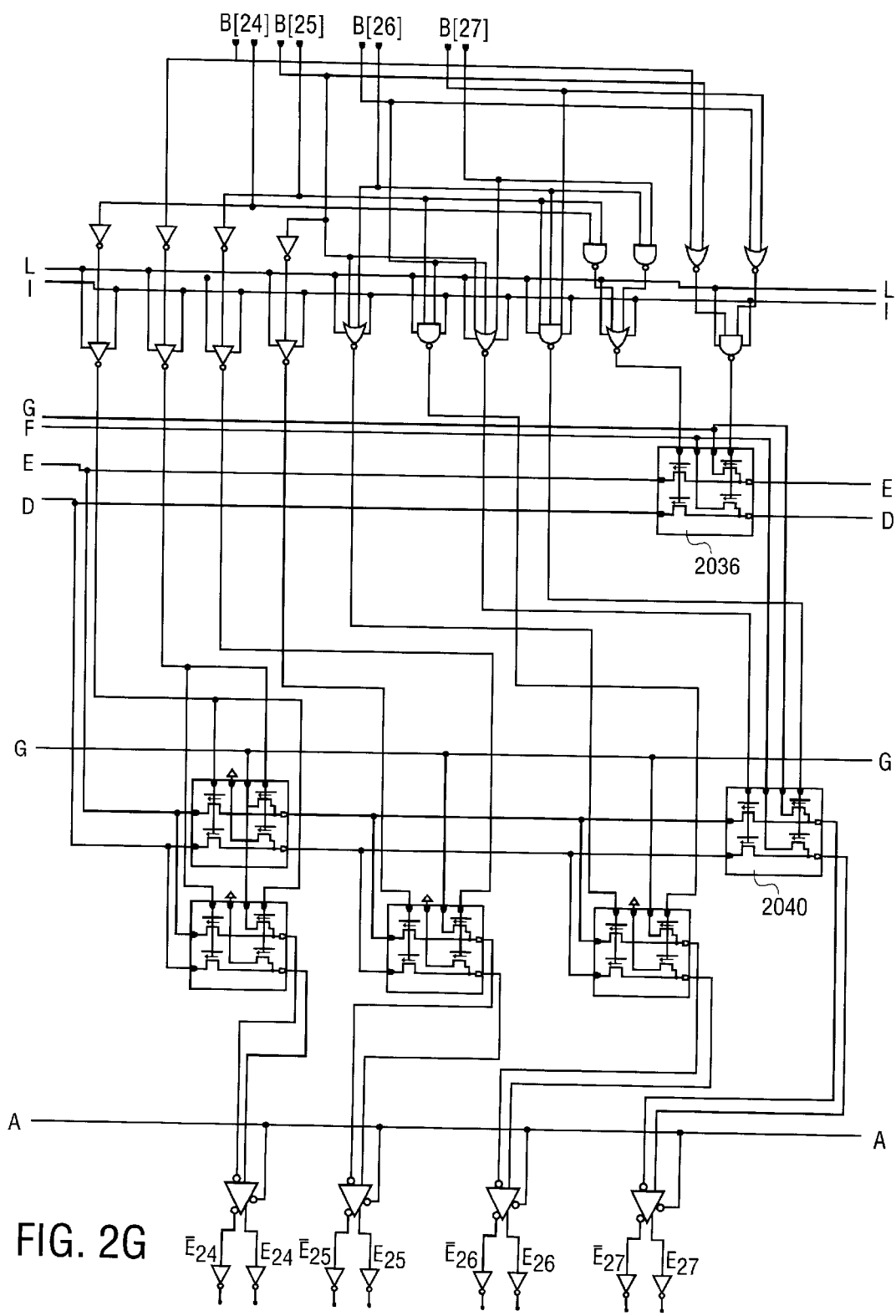
Figure 2H:
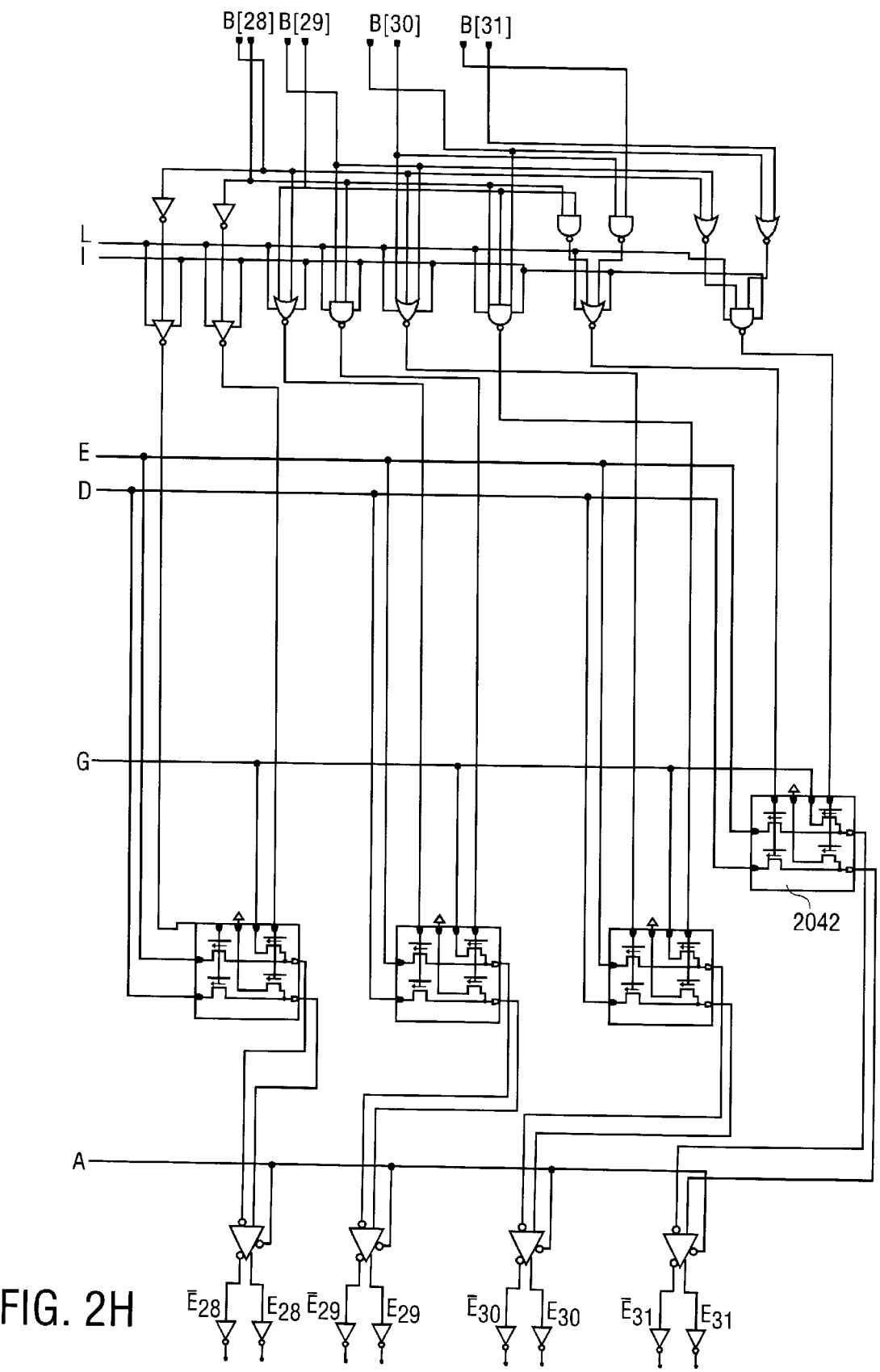

In order to concisely describe the embodiments, it is useful to first introduce terminology. The two-element Boolean algebra is relevant to switching circuits. At any node in a circuit for which a voltage is well defined, the term LOW will denote a set of voltages that map into one of the two Boolean elements, and the term HIGH will denote a set of voltages that map into the other of the two Boolean elements. The particular range of voltages that map into the Boolean elements depends upon the technology used, and may be different for different parts of a single circuit. To avoid dealing with set terminology, we shall say that a voltage is LOW (HIGH) if it belongs to the set LOW (HIGH). We also follow the convention that for any given node within a circuit, LOW voltages are less than HIGH voltages.

For the particular embodiments described herein, we shall incur a slight (but usual) abuse of notation by allowing Boolean variables to also represent voltages. It is customary to identify HIGH with the identity element for the binary Boolean operation AND, denoted as "1" or "one", and to identify LOW with the identity element for the binary Boolean operation OR, denoted as "0" or "zero", and this custom is followed here. Such an identification is pedagogically useful, but arbitrary, and it should be appreciated that the present invention is not limited by this particular identification of voltages with Boolean elements. It will be clear from context whether a variable under discussion is a Boolean variable or a voltage.

For any Boolean variable x that also represents a voltage, we shall say that the voltages x and $\bar{x}$ are complementary to each other, where a bar over a Boolean variable denotes its Boolean complement.

Let B denote an n-tuple of Boolean variables taken from the two-element Boolean algebra, with components denoted by B[i], i=0,1, ... n-1, where B[0] is the most significant bit and B[n-1] is the least significant bit. Futhermore, as discussed above, the Boolean variable B[i] may also denote a voltage.

A priority encoder provides an output indicative of the position of the leading one or leading zero of B. In some embodiments, the output of a priority encoder may comprise a set of n voltages $E_i$, i=0,1, ... n-1 in which all the $E_i$ are LOW if there is no leading one (zero) in B and only one $E_i$ is HIGH if there is a leading one (zero), with the index i for which $E_i$ is HIGH representing the position of the leading one (zero). Alternatively, in other embodiments the terms "HIGH" and "LOW" may be interchanged in the previous statement.

In the particular embodiment described here, a priority encoder is described for providing output voltages indicative of the position of the leading one. For a priority encoder that provides the position of the leading one of B where $E_i$=HIGH if and only if the leading one is in position i, the $E_i$ when considered as Boolean variables satisfy the following Boolean relationship:

$$E_i = B[i] \prod_{j=0}^{i-1} \overline{B}[j], \; i > 0,$$

$$E_0 = B[0],$$

where the product term indicates Boolean AND.

Continuing with the description of terminology, we shall let $\phi$ denote a pulse voltage signal. In some embodiments, and in particular for the embodiments discussed here, the pulse voltage signal may be derived from a clock signal. In describing the embodiments, we will consider the pulse voltage signal at different nodes within an embodiment circuit. The pulse voltage signal will be a function of time and position. Furthermore, at any given node position within a circuit, the pulse voltage signal may also depend upon the particular propagation path by which the pulse voltage signal propagates to the node position under discussion. To avoid unwieldy notation, we shall let $\phi$ be a generic symbol in the sense that it may represent the pulse voltage signal at various node positions within a circuit and for various propagation paths. When it is necessary to distinguish among more than one propagation path, subscripts with the symbol $\phi$ may be used.

We shall also have occasion to represent various voltages in the embodiment circuit by the notation $gf(B)$, where g is a voltage and $f(\bullet)$ is a Boolean function. The value of the voltage represented by $gf(B)$ is simply obtained by mapping the Boolean value of $f(B)$ into a corresponding binary value, and multiplying the voltage g by that binary value. The correspondence used in the disclosed embodiments is to correspond the Boolean identity element under logical AND with the binary identity element under multiplication, and the Boolean identity element under logical OR with the binary identity element under addition. That is, a logical 1 corresponds with the binary value one, and a logical 0 corresponds with the binary value zero. This correspondence is made for pedagogical purposes only. As an example, the voltage $\phi\overline{B}[0]$ at some given node is the voltage of the pulse voltage signal $\phi$ at the given node if and only if $B[0]$ is a Boolean 0.

In describing the embodiments, we shall use the term differential voltage (or differential voltage signal or differential signal). This concept will be made more clear when describing the particular embodiments, but it may be useful to give some meaning to it now, as follows. Let $f(\bullet)$ denote a Boolean function. At some set of two nodes within a circuit, a differential voltage is a set of two voltages $\{v_1, v_2\}$ at the two nodes where, provided the pulse voltage signal at one of the two nodes is not at some reference voltage (usually choosen as ground), $v_1 > v_2$ if $f(\bullet)=1$ and $v_2 > v_1$ if $f(\bullet)=0$.

For example, suppose at two nodes in a circuit we have the voltages $v_1$ and $v_2$, and suppose there are two propagation paths for providing two positive pulse voltage signals $\phi_1$ and $\phi_2$. For two Boolean variables x and y, let the voltages be given by $v_1 = \phi_1 x + \phi_2 \overline{x} y$ and $v_2 = \phi_2(\overline{x})(\overline{y})$. Then it is seen that $v_1$ and $v_2$ comprises a differential voltage as described above, where the Boolean function is $f = x + y$. Note, however, that in this example the voltage difference depends upon not only the value of $f$, but also the values of x and y. For example, $f=1$ where $x=1$ and y is any value, $|v_1 - v_2| = \phi_1$, but for $f=1$ where $x=0$ and $y=1$, $|v_1 - v_2| = \phi_2$. (A circuit realization of this will be described later).

Also note that in the previous example, one of the two voltages $v_1$ and $v_2$ is zero. For some embodiments, and in particular for the embodiments described here, one of the two voltages will be at ground (or substantially at ground), which we may take to be zero volts.

We represent a differential voltage signal by the simplified notation $\{f(\bullet)\}$. From the way in which we have defined a differential voltage, $\{\overline{f}(\bullet)\}$ also represents the same differential voltage as $\{f(\bullet)\}$. That is, the notation $\{f(\bullet)\}$ (or equivalently $\{\overline{f}(\bullet)\}$) is to mean a differential voltage indicative of the Boolean function $f(\bullet)$ (or equivalently $\overline{f}(\bullet)$).

FIGS. 2a–2h (denoted collectively as FIG. 2) provide an embodiment of a 32-bit priority encoder, where the full priority encoder circuit is obtained by sequentially connecting FIGS. 2a–2h left-to-right with interconnects on the right hand side of a figure connected to like-labeled interconnects on the left hand side of the next sequential figure. Above the input terminals to the priority encoder of FIG. 2 are written the components of B, and the voltages on the input terminals are indicative of the components of B and $\overline{B}$. For example, the voltage on input terminal 201 is LOW if $B[0]=0$ and is HIGH if $B[0]=1$. As another example, the voltage on input terminal 203 is LOW if $B[0]=0$ and is HIGH if $B[0]=1$. Similar statements apply to all the other input terminals, but for simplicity these other input terminals are not explicitly labeled except for their association with the components of B.

The output terminals of the priority encoder of FIG. 2 are labeled by $E_i$ (or its complement) over the range of index i. Additional buffers or drivers (not shown) may be connected to these output terminals.

Terminal or node 206 is driven according to a clock voltage signal. The clock voltage signal at node 208 is a delayed version of the clock voltage signal at node 206. The pulse voltage signal at node 210 is similar to the clock voltage signal at node 208 except its rising edge is delayed. The clock voltage signal at node 211 is a delayed and inverted version of the clock voltage signal at node 210, and the clock voltage signal at node 212 is a delayed version of the pulse voltage signal at node 210. The clock voltage signal of node 208 is used to drive domino logic gates, and these domino logic gates are represented in FIG. 2 by those gate symbols having explicit lines connected to node 208. For example, inverter 214 and NOR gate 216 are domino logic gates clocked by the clock voltage signal of node 208.

The pulse voltage signal at node 210 is used to provide signals to various pass cells within FIG. 2. In FIG. 2, pass cells are those sub-circuits that are enclosed within a rectangle and comprise either four nMOSFETs (n-Metal Oxide Semiconductor Field Effect Transistors) or six nMOSFETs. These pass cells will be described in more detail later. The clock voltage signal at node 212 is used to drive latch circuits, such as latch circuits 218 and 220, and the clock voltage signal at node 211 is used to drive sense amplifiers, denoted by circuit symbol 222.

We now describe how the previously displayed Boolean expressions for the $E_i$ are realized by the priority encoder of FIG. 2.

It is readily seen from FIG. 2 that conventional CMOS logic is used for the first four outputs $E_i$, $i=0,1,2,3$. The remaining outputs, however, utilize pass cells and sense amplifiers. It is useful to first consider the function of a pass cell. There are two types of pass cells shown in FIG. 2, which for the purpose of describing the embodiment of FIG. 2 we may for convenience classify as either four-transistor pass cells or six-transistor pass cells. One may consider the input terminals to the pass cells as those terminals labeled vp, vp#, a, or a#. These terminals will be referred to as pass terminals, and the signals at these terminals will be referred to as pass signals. The output terminals are those terminals labeled o or o#. The terminals connected to the gates of the transistors will be referred to as control terminals, and the signals on these terminals will be referred to as control signals. The input-output relationships for these two types of pass cells are similar to each other, as discussed below.

For the embodiment of FIG. 2, the control signals for each pass cell are provided by the domino logic gates. For other embodiments, these control signals may be provided by other types of circuits. In FIG. 2, for each pass cell, the vp# terminal is grounded and the vp terminal is connected to node 210 so as to be responsive to the pulse signal at node 210. The voltages at vp# and vp therefore comprise a differential voltage, where the Boolean function $f$ may be taken as the constant 1. As will be described later, the voltages at the two input terminals a and a# comprise a differential voltage.

We now consider the input-output relationships of the pass cells.

Figure 3A:
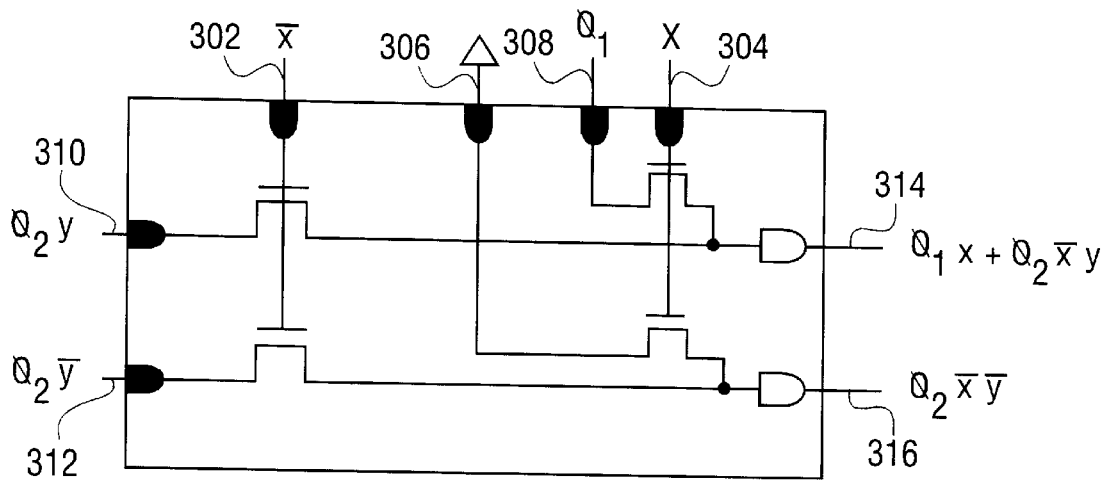
FIGS. 3a-b are embodiments of four-transistor pass cells.

A four-transistor pass cell is illustrated in FIGS. 3$a$ and 3b, where terminals 302 hand 304 are the control terminals, terminals 306, 308, 310, and 312 are the pass terminals, and terminals 314 and 316 are the output terminals. The four-transistor pass cells in FIG. 2 are coupled to the domino logic gates so that voltages at the control terminals, during an evaluation phase, are complementary to each other. Also, the four-transistor pass cells in FIG. 2 are such that voltages at pass terminals 306 and 308 are complementary to each other, and voltages at pass terminals 310 and 312 are complementary to each other.

Two pulse voltage signals, $\phi_1$ and $\phi_2$, are available to the four-transistor pass cell in FIG. 3$a$. Making the simplfying assumption that no signal loss is incurred due to signal propagation through the nMOSFETs of FIG. 3$a$, the output voltages at terminals 314 and 316 in FIG. 3$a$ are given as shown in FIG. 3$a$ in terms of these two pulse voltage signals and the voltages (or Boolean variables) x and y. (Summation of Boolean variables denotes Boolean OR.) The output voltages of FIG. 3$a$ comprise the differential voltage $\{(x+y)\}$. Note that the pass cell of FIG. 3$a$ is a circuit realization for the example discussed previously regarding differential voltages in which more than one pulse voltage signal may be present.

It should be appreciated that in FIG. 3$a$ we have made the assumption that the pulse voltage signals at the pass terminals are the same as the pulse voltage signals at the output terminals. However, the actual pulse voltage signals may depend upon the loading on the output terminals and the transfer characteristics of the various nMOSFETs and interconnects in the path traveled by the pulse voltage signal. Using different symbols to reflect this fact would have been unnecessarily unwieldy, and for purposes of describing the embodiments this distinction need not be explicitly made.

For purposes of describing the disclosed embodiments, we will suppress the subscripts for the pulse voltage signal $\phi$ and consider FIG. 3$b$ as a description for the input-output relationship of the pass cells in FIG. 2. Furthermore, when representing a voltage at some node as $\phi f(\cdot)$, it is to be understood that the pulse voltage signal $\phi$ in this voltage representation is to be taken as the pulse voltage signal at the node under interest. As discussed previously, the pulse voltage signal may also depend upon the value of $f(\cdot)$ because the propagation path may depend upon $f(\cdot)$.

Figure 4:
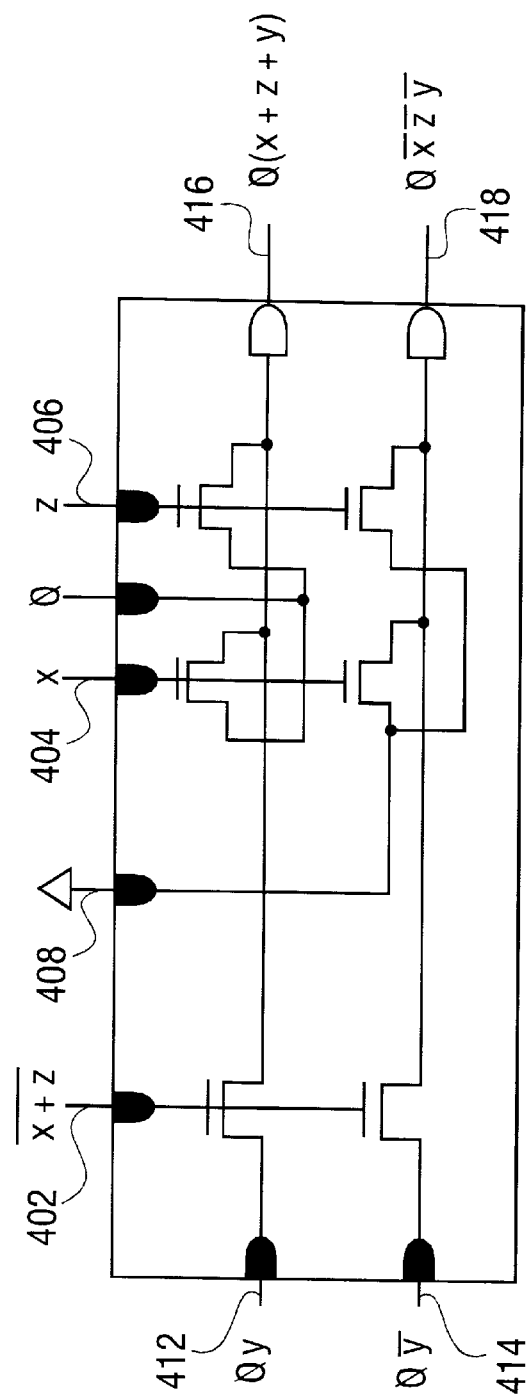
FIG. 4 is an embodiment of a six-transistor pass cell.

FIG. 4 illustrates a six-transistor pass cell. In FIG. 2, the six-transistor pass cells are coupled so that the pass and control voltages satisfy the relationships as shown in FIG. 4, where again subscripts for the pulse voltage signal $\phi$ are suppressed for notational simplicity. Note that the control voltage at control terminal 402 is complementary to the Boolean OR of the control voltages at control terminals 404 and 406. The output voltages at output terminals 416 and 418 are indicated in FIG. 4, and are seen to comprise the differential voltage signal $\{(x+z+y)\}$.

With the above formalism for representing voltages and the input-output relationships for the pass cells, it is now a relatively straightforward procedure to determine the voltages among the various interconnects in the priority encoder of FIG. 2, and to show that the output voltages provided by the sense amplifiers are the $E_i$ as given according to the earlier displayed Boolean expressions. In particular, using the terminology introduced here, we describe in detail how some of the voltages for some of the interconnects in FIG. 2 are determined.

The voltages on interconnects 228 and 230, during an evaluation phase of the domino logic gates, are respectively $$\prod_{i=0}^{3} \overline{B}[i] \text{ and } \prod_{i=0}^{3} B[i],$$

where the summation term indicates Boolean OR. Applying the input-output relationship of FIG. 3$b$ to pass cell 236, the output voltages (again during an evaluation phase of the domino logic gates) on interconnects 232 and 234 are respectively $$\varphi \prod_{i=0}^{3} \overline{B}[i] \text{ and } \varphi \prod_{i=0}^{3} B[i],$$

which is seen to be the differential voltage $$\left\{\sum_{i=0}^{3} B[i]\right\}.$$

This differential voltage is provided to pass cells 238 and 240.

The voltages on interconnects 241 and 243 are respectively B[4] and $\overline{B}$[4]. Applying the input-output relationship of FIG. 3$b$ to pass cell 240, it is seen that the voltage on interconnect 242 is $$\varphi B[4] \prod_{i=0}^{3} \overline{B}[i] = \varphi E_4.$$

Similarly, the voltage on interconnect 244 is $\phi \overline{E}_4$. Therefore the differential voltage at terminals 242 and 244 is $\{E_4\}$, which is provided as an input to sense amplifier 222. Sense amplifier 222 is responsive to this input differential voltage, providing output voltages $E_4$ and $\overline{E}_4$ on interconnects 248 and 250, respectively.

Figure 5:
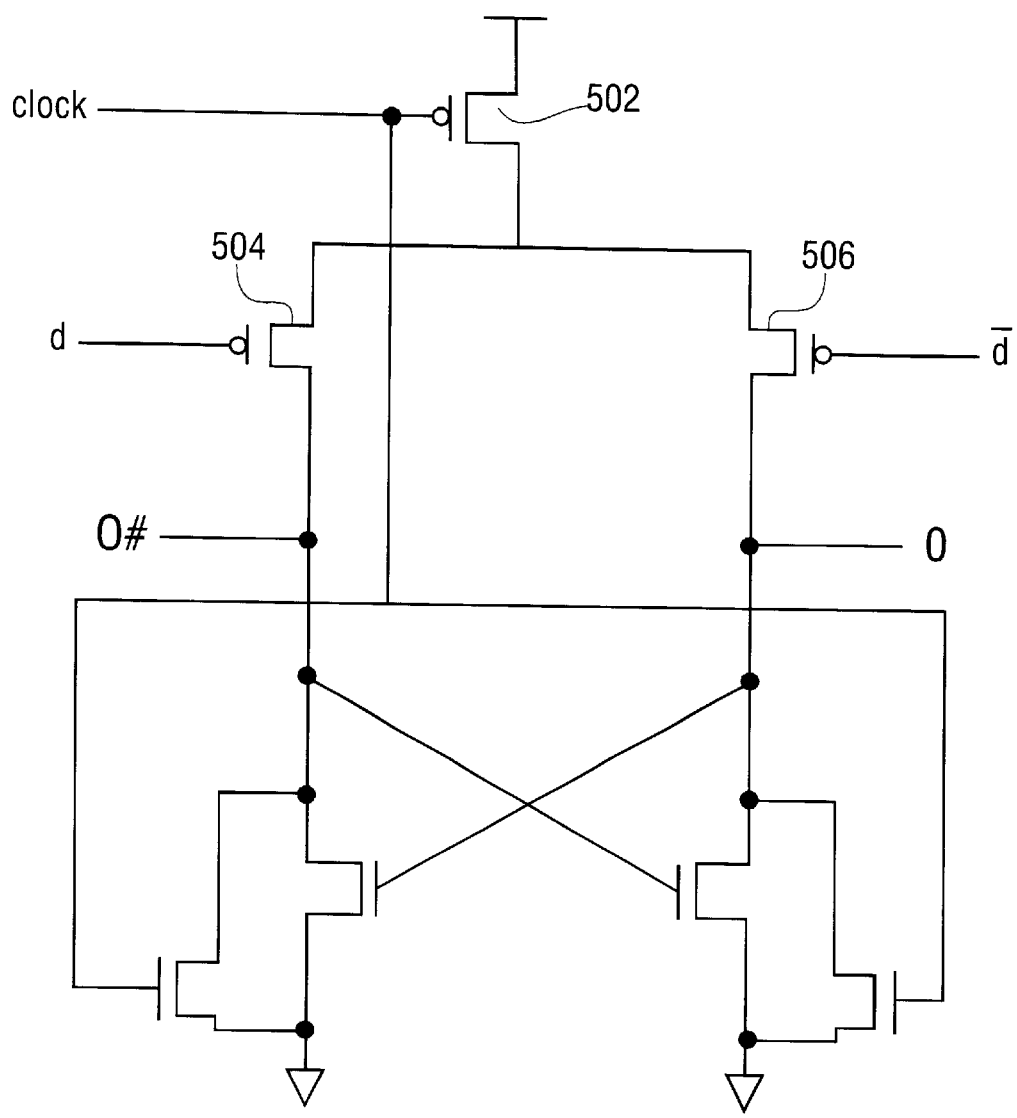
FIG. 5 is an embodiment of a sense amplifier.
Figure 5:
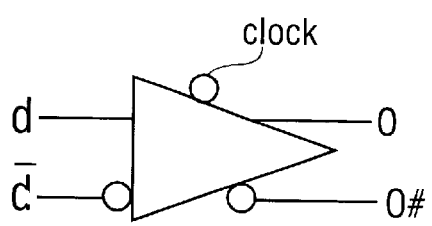

A circuit embodiment for a sense amplifier is given in FIG. 5 along with its circuit symbol as used in FIG. 2. A clock voltage signal is applied to the gate of pMOSFET 502, and an input differential voltage is applied to the gates of pMOSFETs 504 and 506. The output voltage is taken at the drains of pMOSFETs 506 and 504. The output voltage difference $|o-\overline{o}|$ is substantially the supply voltage $V_{DD}$, whereas the input voltage difference $|d-\overline{d}|$ may be much less than $V_{DD}$. The circuit of FIG. 5 is only one particular embodiment for a sense amplifier, and a very large number of such circuits are well known to those of ordinary skill in the art.

In the embodiment of FIG. 2, the rising edge of the pulse voltage signal at node 210 is delayed with respect to the rising edge of the clock voltage signal at node 208, which is applied to the domino logic gates, so that the domino logic gates provide the proper control voltages to the pass cells before the pulse voltage signals available to the pass cells begin to rise. The clock voltage signal at node 211, which is applied to the sense amplifiers, is delayed (and inverted) relative to the pulse voltage signal at node 210 so as to allow a set-up time for the output differential voltages of the pass cells before the sense amplifiers are clocked. Note that the sense amplifier of FIG. 5 is a pMOSFET type, where the sense amplifier is clocked when the clock voltage signal at node 211 is LOW.

Figure 3B:
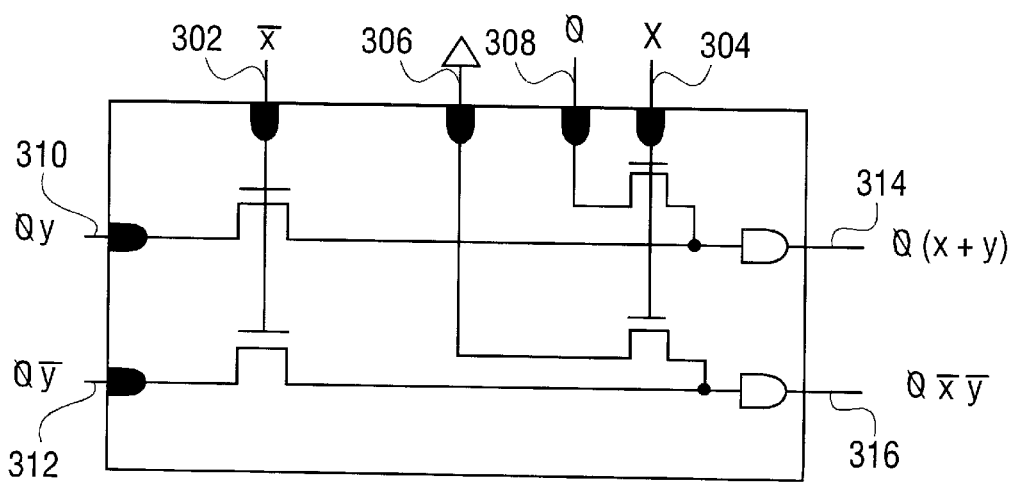

Continuing with the description of various interconnect voltages for the priority encoder circuit of FIG. 2, upon applying the input-output relationship of FIG. 3b to pass cell 238, it is seen that the output voltages on interconnects 252 and 254 are respectively $$\varphi \prod_{i=0}^{4} B[i] \text{ and } \varphi \prod_{i=0}^{4} \overline{B}[i],$$

which is the differential voltage $$\left\{ \prod_{i=0}^{4} B[i] \right\}.$$

This differential voltage is applied to the input terminals of pass cells 256 and 258. The voltages on interconnects 260 and 262 are respectively B[5] and $\overline{B}$[5], which are the control voltages to pass cells 256 and 258. Again, applying the input-output relationship of FIG. 3b to pass cells 256 and 258, it is seen that the voltages on interconnects 264 and 266 are respectively $\phi E_5$ and $\phi \overline{E}_5$, the differential voltage $\{E_5\}$, and the voltages on interconnects 268 and 270 are respectively $$\varphi \sum_{i=0}^{5} B[i] \text{ and } \varphi \prod_{i=0}^{5} \overline{B}[i],$$

the differential voltage $$\left\{ \prod_{i=0}^{5} B[i] \right\}.$$

Continuing in this way, we see that pass cell 288 provides the differential voltage $\{E_6\}$, pass cell 286 provides the differential voltage $$\left\{ \prod_{i=0}^{6} B[i] \right\}$$

as an input pass differential voltage to pass cell 290, and pass cell 290 provides differential voltage $\{E_7\}$.

Now consider six-transistor pass cell 274. In FIG. 2, domino logic gates are used to provide the control voltages to pass cell 274, which are $$\prod_{i=0}^{7} \overline{B}[i]$$

on interconnect 292, $$\sum_{i=0}^{3} B[i]$$

on interconnect 294, and $$\sum_{i=4}^{7} B[i]$$

on interconnect 296. The voltages on terminals a and a# of pass cell 274 are ground and the pulse voltage signal at node 210, respectively. Applying the input-output relationship of FIG. 4 to pass cell 274, the voltage on interconnect 298 is $$\varphi \sum_{i=0}^{7} B[i]$$

and the voltage on interconnect 2002 is $$\varphi \prod_{i=0}^{7} \overline{B}[i],$$

i.e., these voltages comprise the differential voltage $$\left\{ \sum_{i=0}^{7} B[i] \right\}.$$

This differential voltage is provided as an input pass differential voltage to pass cells 2004 and 2006. It is not difficult to see that pass cell 2006 provides the differential voltage $\{E_8\}$ at its output terminals, and pass cell 2004 provides the differential voltage $$\left\{ \sum_{i=0}^{8} B[i] \right\}$$

to the pass terminals of pass cell 2008. Continuing in this way, it is straightforward to see that pass cells 2010, 2012, and 2014 provide, respectively, differential voltages $\{E_9\}$, $\{E_{10}\}$, and $\{E_{11}\}$.

Six-transistor pass cell 274 provides the differential voltage $$\left\{ \sum_{i=0}^{7} B[i] \right\}$$

to the pass terminals of four-transistor pass cell 276. The domino logic gates provide to pass cell 276 the control voltages $$\prod_{i=8}^{11} \overline{B}[i] \text{ and } \sum_{i=8}^{11} B[i].$$

Applying the input-output relationship of FIG. 3b to pass cell 274, it is seen that pass cell 274 provides the differential voltage $$\left\{\sum_{i=0}^{11} B[i]\right\}$$

to pass cells 278 and 279. Pass cell 279 provides the differential voltage {E$_{12}$} and pass cell 278 provides the differential voltage $$\left\{\sum_{i=0}^{12} B[i]\right\}$$

to pass cell 280.

Continuing in this way by applying the input-output relationships of FIGS. 3b and 4 to the various pass cells within the circuit embodiment of FIG. 2, it is not difficult to show that the differential voltages {E$_i$}, i=4, ... 31 are obtained as indicated in FIG. 2 and are provided as input to the sense amplifiers so as to provide the voltages E$_i$, i=4, ... 31.

Note that pass cell 2016 could have provided the differential voltage $$\left\{\sum_{i=0}^{10} B[i]\right\}$$

as the pass voltages to a four-transistor pass cell (not shown) to provide the differential voltage $$\left\{\sum_{i=0}^{11} B[i]\right\},$$

so that pass cell 276 would not be needed. However, such an arrangement would lead to a path of six pass cells from node 210 to sense amplifier 2018 (pass cells 274, 2004, 2008, 2016, the added pass cell not shown, and 279), a path of seven pass cells to provide the differential voltage { E$_{13}$}, etc. However, with pass cells 274 and 276 as shown, there is a path of only three pass cells from node 210 to sense amplifier 2018. It is to be appreciated that, all other parameters being held fixed, increasing the number of pass cells that the pass signals propagate through will increase the delay of the circuit. In the particular embodiment of FIG. 2, the maximum number of pass cells between node 210 and any sense amplifier is six, comprising pass cells 274, 276, 278, 280, 282, and 284 to provide the differential voltage {E$_{15}$}.

In the 32-bit priority circuit embodiment of FIG. 2, the number of pass cells in a path is kept from exceeding six by using pass cells 274, 2020, and 2022 with control voltages responsive to eight bits of B, and by using pass cells 236, 276, 2034, and 2036 with control voltages responsive to four bits of B. The output voltages of a pass cell with control voltages responsive to four bits of B is a differential voltage that involves four more bits of B than the input pass differential voltage to the pass cell, and the output voltages of a pass cell with control voltages responsive to eight bits of B is a differential voltage that involves eight more bits of B than the input pass differential voltage to the pass cell. For example, the control voltages to pass cell 2020 are $$\prod_{i=8}^{15} \overline{B}[i]$$

on interconnect 2024, $$\prod_{i=8}^{11} B[i]$$

on interconnect 2026, and $$\prod_{i=12}^{15} B[i]$$

on interconnect 2028, and the pass voltages on interconnects 2030 and 2032 comprise the differential voltage $$\left\{\sum_{i=0}^{7} B[i]\right\},$$

so that the differential voltage at the output of pass cell 2020 is $$\left\{\sum_{i=0}^{15} B[i]\right\}.$$

In a sense, pass cell 274 provides a path to bypass pass cells 236, 238, 256, 286, and 290, and pass cell 2020 provides a path to bypass pass cells 2004, 2008, 2016, 2014, 278, 280, 282, and 284. A similar statement applies to the other six-transistor pass cell 2022. Also, pass cell 276 provides a path to bypass pass cells 2004, 2008, 2016, and 2014. Similar statements apply to four-transistor pass cells 2034 and 2036.

Note that pass cells 2038, 2040, and 2042, which provide differential voltages {E$_{23}$}, {E$_{27}$}, and {E$_{31}$}, respectively, have control voltages responsive to more than one bit of B, so as to keep the maximum path length of pass cells below seven. For example, the control voltages for pass cell 2038 are $\overline{B}[22]\overline{B}[23]$ on interconnect 2052 and $B[22]+\overline{B}[23]$ on interconnect 2054. Note also that the differential voltage at the pass terminals of pass cell 2038 is $$\left\{\sum_{i=0}^{21} B[i]\right\}.$$

When the clock voltage signal at node 208 goes to ground, the domino logic gates go into their pre-charge phase, thereby bringing all control voltages to the pass cells HIGH. The pulse voltage signal at node 210 will also go to ground when node 208 is at ground, so that with the control voltages HIGH due to the domino logic gates in their pre-charge phase, all nodes in the pass cells will be brought to ground. (If domino logic gates were not used, then additional circuit components could be added to pre-charge all nodes in the pass cells to some reference level, such as ground.) The clock voltage signal at node 208 and pulse voltage signal at node 210 are such that the domino logic performs its pre-charge phase and then a new evaluation phase before the next rising edge of the pulse voltage signal at node 210. In this way, the voltages at the output terminals of the pass cells start at the same potential (ground) when the pulse voltage signal at node 210 is brought HIGH, and the proper differential voltages are developed by the pass cells. The sense amplifiers are then clocked so as to be responsive to these differential voltages.

Because the sense amplifiers are responsive to differences in voltages, it is not necessary that the pulse voltage signal at node 210 return to ground. For example, in some embodiments the a and vp# terminals of the pass cells could be kept at some reference voltage different from ground (or substrate) potential, and the pulse voltage signal at node 210 could pulse between HIGH and this reference voltage instead of ground.

Indeed, it is not even necessary for there to be a pulse voltage signal applied to the pass cells. For example, if terminals a# and vp were held HIGH and terminals a and vp# were held LOW, then the correct differential voltages would eventually be provided by the pass cells for some given input B.

However, in the embodiment of FIG. 2, because pMOS-FET sense amplifiers are employed, it is preferable that all nodes within the pass cells return to ground when the domino logic gates are in their pre-charge phase. In this way, during the pre-charge phase of the domino logic gates, pMOSFETs 504 and 506 will be ON (PMOSFET 502 will be ON because the clock voltage signal on its gate will be LOW). Consequently, the pMOSFET sense amplifiers will respond more quickly to differential voltages when the domino logic gates go into their evaluation phase than in the case if pMOSFETs 504 and 506 were not fully turned ON (or if they were OFF).

The voltage swing at two nodes having the differential voltage $\{v_1, v_2\}$ is the absolute value of their difference, $|v_1-v_2|$. By reducing the voltage swings of the differential voltages, dynamic power dissipation is reduced. In the embodiment of FIG. 2, the voltage swings are kept less than the supply voltage $V_{DD}$. This can be accomplished in several ways. One approach is to provide a small enough duty cycle for the pulse voltage signal at node 210 so that the differential voltages at the output terminals of the pass cells do not have time to reach the supply voltage. Alternatively, clocking in the input tuple B fast enough may also achieve this result by causing the control voltages on the pass cells to change quickly enough so that the differential voltages do not reach the supply voltage.

Transistors making up a propagation path for the pass signals are scaled to account for the propagation path. For example, for the particular embodiment of FIG. 2, the relative sizes of nMOSFETs 2044, 2048, and 2050 are, respectively, 4.04, 2.7, and 1.36.

Four-transistor pass cells may be used in place of six-transistor pass cells. However, to provide the proper control voltages, additional domino logic (or additional fan-in) may be needed. For example, a four-transistor pass cell may be used in place of the six-transistor pass cell 274 provided the control voltage $$\sum_{i=0}^{7} B[i]$$

is available. Similarly, six-transistor pass cells may be used in place of four-transistor pass cells. For example, a six-transistor pass cell may be used in place of four-transistor pass cell 236 provided the control voltages are $$\sum_{i=0}^{1} B[i] \text{ and } \sum_{i=2}^{3} B[i].$$

Figure 6:
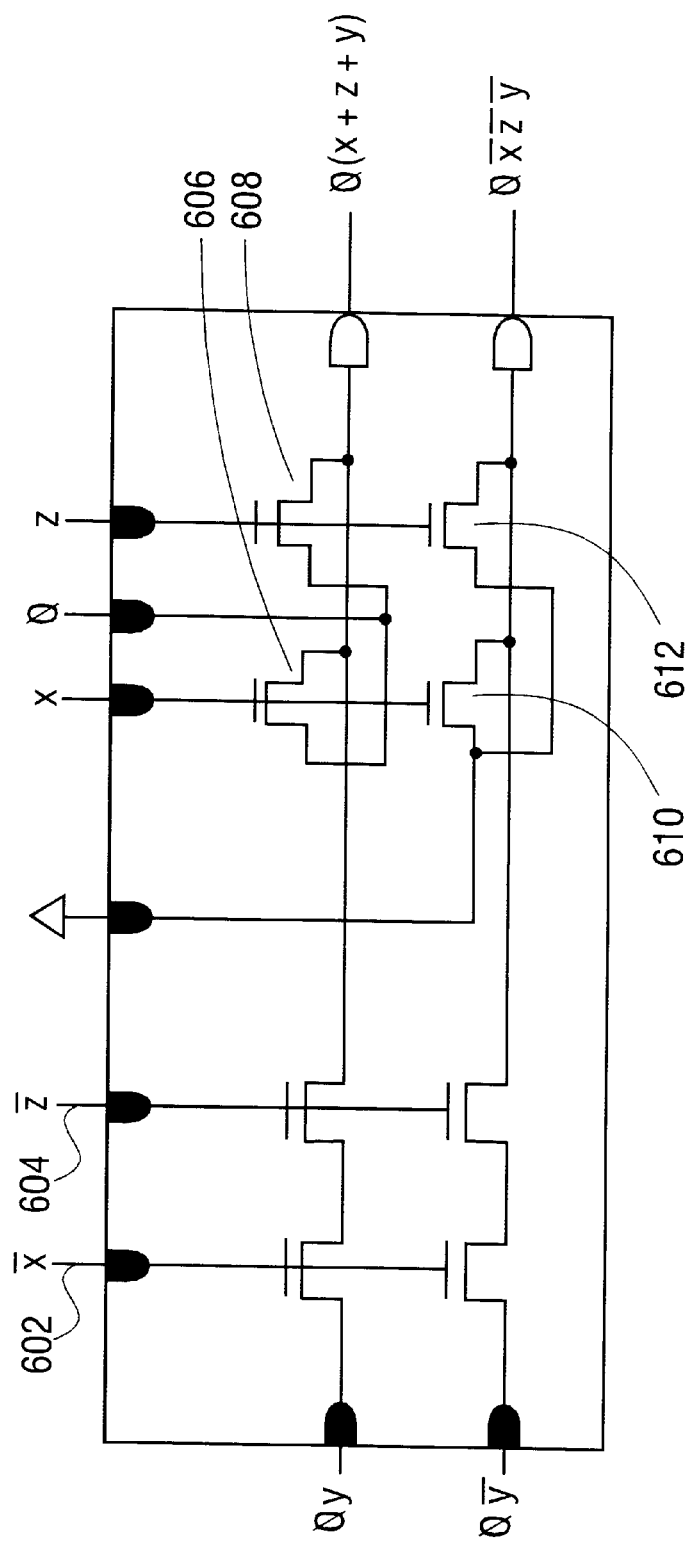
FIG. 6 is an embodiment of an eight-transistor pass cell.

Indeed, many different types of pass cells may be employed. For example, an eight-transistor pass cell is shown in FIG. 6 with the same input-output relationship as for the pass cell of FIG. 4, except that instead of providing the control voltage $(\overline{x})(\overline{z})=\overline{x+z}$ as is done at terminal 402 of FIG. 4, the control voltages $\overline{x}$ and $\overline{z}$ are provided at terminals 602 and 604 of FIG. 6. The pass cell of FIG. 6 may replace the six-transistor pass cells in FIG. 2 provided the proper control voltages are applied, in which case an embodiment may have domino logic gates with less fan-in, but there would be more nMOSFETs in series in various propagation paths involving pass cells.

One may also have pass cells that have additional nMOS-FETs in parallel with nMOSFETs 606 and 608, and in parallel with nMOSFETs 610 and 612. Clearly there are many tradeoffs, such as trading off the complexity of providing control voltages with the number of nMOSFETs needed in the pass cells. Furthermore, pMOSFETs, as well as other types of transistors, whether IGFET (Insulated Gate Field Effect Transistor), bipolar, FET (Field-Effect Transistor), or others, may be used in place of some or all of the nMOSFETs in the pass cells. However, usually pass cells with nMOSFETs are faster than pass cells with pMOSFETs.

In general, a pass cell may have two sets of s transistors coupled in series having control voltages $\{y_j, j=1, 2, \ldots s\}$ and two sets of r transistors coupled in parallel having control voltages $\{x_j, j=1, 2, \ldots r\}$, where $$\prod_{j=1}^{s} y_j = \overline{\sum_{j=1}^{r} x_j}.$$

If this generalized pass cell is used to provide the differential voltage $\{E_i\}$, then in one embodiment the input differential voltage at the pass terminals is $$\left\{\sum_{j=0}^{k-1} B[j]\right\}$$

for some k, where k≤i, and the control voltages are related to B by $$\sum_{j=1}^{r} x_j = \sum_{j=k}^{i-1} B[j] + \overline{B}[i]$$

and $$\prod_{j=1}^{s} y_j = B[i] \prod_{j=k}^{i-1} \overline{B}[j].$$

For notational simplicity, it is to be understood that for any Boolean variable x[j], $$\sum_{j=i}^{i-1} x[j] = 0$$

and $$\prod_{j=i}^{i-1} x[j] = 1.$$

In addition to various types of pass cells, different circuit structures may be employed. For example, instead of choosing four and eight as the number of bits of B used to provide control voltages to the pass cells providing the "bypass paths", other numbers may be chosen. Indeed, more than two layers of bypass paths may be employed.

Many modifications may be made to the disclosed embodiments without departing from the scope of the invention as claimed below.

What is claimed is:

1. A priority encoder for an input n-tuple B, the priority encoder comprising:

a pass cell, having first and second output terminals, to provide at its first and second output terminals an output differential voltage indicative of $$E_i = B[i] \prod_{j=0}^{i-1} \overline{B}[j]$$

for an i, where 0<i<n.

2. The priority encoder as set forth in claim 1, wherein to provide the output differential voltage the pass cell has first and second pass terminals at an input differential voltage indicative of $$\sum_{j=0}^{k-1} B[j]$$

for some k, where k≤i.

3. The priority encoder as set forth in claim 2, wherein to provide the output differential voltage the pass cell has a set of control voltages $$\{x_j, y_m: j=1, 2, \ldots r; m=1, 2, \ldots s\}$$

such that $$\sum_{j=1}^{r} x_j = \sum_{j=k}^{i-1} B[j] + \overline{B}[i]$$

and $$\prod_{m=1}^{s} y_m = B[i] \prod_{m=k}^{i-1} \overline{B}[m].$$

4. The priority encoder as set forth in claim 3, wherein k=i so that $$\sum_{j=1}^{r} x_j = \overline{B}[i]$$

and $$\prod_{m=1}^{s} y_m = B[i].$$

5. The priority encoder as set forth in claim 4, wherein s=r=1.

6. The priority encoder as set forth in claim 3, wherein s=r=1.

7. The priority encoder as set forth in claim 3, wherein the pass cell comprises:

a first set of s IGFETs (Insulated Gate Field Effect Transistor) coupled in series between the first pass terminal and the first output terminal to allow signal propagation from the first pass terminal to the first output terminal if the first set of s IGFETs are all ON;

a second set of s IGFETs coupled in series between the second pass terminal and the second output terminal to allow signal propagation from the second pass terminal to the second output terminal if the second set of s IGFETs are all ON; wherein for each m=1, 2, ... s, an $m^{th}$ IGFET belonging to the first set of s IGFETs is coupled to an $m^{th}$ IGFET belonging to the second set of s IGFETs so that both $m^{th}$ IGFETs are either ON or OFF in response to the control voltage $y_m$;

a first set of r IGFETs coupled in parallel to allow propagation of a pulse voltage signal to the first output terminal if any IGFET belonging to the first set of r IGFETs is ON; and a second set of r IGFETs coupled in parallel to drive the second output terminal to ground if any IGFET belonging to the second set of r IGFETs is ON; wherein for each j=1, 2, ... r, a $j^{th}$ IGFET belonging to the first set of r IGFETs is coupled to a $j^{th}$ IGFET belonging to the second set of r IGFETs so that both $j^{th}$ IGFETs are either ON or OFF in response to the control voltage $x_m$.

8. The priority encoder as set forth in claim 7, wherein s=r=1.

9. The priority encoder as set forth in claim 7, wherein k=i so that $$\sum_{j=1}^{r} x_j = \overline{B}[i]$$

and $$\prod_{m=1}^{s} y_m = B[i].$$

10. The priority encoder as set forth in claim 9, wherein s=r=1.

11. A priority encoder for an input n-tuple B, the priority encoder comprising:

a first pass cell to provide an output differential voltage indicative of $$\sum_{j=0}^{p} B[j]$$

for a p where 0<p<n; and a second pass cell to provide an output differential voltage indicative of $$\sum_{j=0}^{q} B[j]$$

for an q where 0<q<p.

12. The priority encoder as set forth in claim 11, wherein to provide their output differential voltages:

the first and second pass cells have input differential voltages indicative of $$\sum_{j=0}^{k} B[j]$$

for a k where k<q;

the first pass cell has a set of control voltages $\{x_j, y_m: j=1,2, \ldots r; m=1,2, \ldots s\}$ such that $$\sum_{j=1}^{r} x_j = \sum_{j=k+1}^{p} B[j]$$

and $$\prod_{m=1}^{s} y_m = \prod_{m=k+1}^{p} \overline{B}[m]; \text{ and}$$

the second pass cell has a set of control voltages $\{z_j, w_m: j=1, 2 \ldots t; m=1,2, \ldots u\}$ such that $$\sum_{j=1}^{t} z_j = \sum_{j=k+1}^{q} B[j]$$

and $$\prod_{m=1}^{u} w_m = \prod_{m=k+1}^{q} \overline{B}[m].$$

13. The priority encoder as set forth in claim 12, wherein s=1, r=2, and t=u=1.

14. The priority encoder as set forth in claim 12, further comprising:

a third pass cell, having first and second pass terminals, coupled to the second pass cell to have its first and second pass terminals at a differential voltage equal to the output differential voltage of the second pass cell, and having first and second output terminals, to provide at its first and second output terminals an output differential voltage indicative of $$E_{q+1} = B[q+1] \prod_{j=0}^{q} \overline{B}[j].$$

15. The priority encoder as set forth in claim 14, wherein to provide its output differential voltage the third pass cell has a set of control voltages indicative of B[q+1] and $\overline{B}$[q+1].

16. The priority encoder as set forth in claim 15, wherein the third pass cell comprises:

a first IGFET coupled in series between the first pass terminal and the first output terminal to allow signal propagation from the first pass terminal to the first output terminal if the first IGFET is ON;

a second IGFET coupled in series between the second pass terminal and the second output terminal to allow signal propagation from the second pass terminal to the second output terminal if the second IGFET is ON; wherein the first IGFET is coupled to the second IGFET so that both first and second IGFETs are either ON or OFF in response to the control voltage $\overline{B}$[q+1];

a third IGFET to allow propagation of a pulse voltage signal to the first output terminal if ON; and a fourth IGFET to drive the second output terminal to ground if ON; wherein for third IGFETs is coupled to third IGFET so that both third and fourth IGFETs are either ON or OFF in response to the control voltage B[q+1].

17. A priority encoder for an input n-tuple B, the priority encoder comprising:

a circuit having first and second output terminals to provide a differential voltage at its first and second output terminals indicative of $$\sum_{j=0}^{k-1} B[j]; \text{ and}$$

a pass cell having first and second pass terminals connected to the first and second output terminals of the circuit, respectively, to provide at the pass cell's first and second output terminals a differential voltage indicative of $$E_i = B[i]\prod_{j=0}^{i-1}\overline{B}[j]$$

for an i, where $0 \leq k \leq i < n$.

18. The priority encoder as set forth in claim 17, wherein the pass cell further comprises:
    a first set of s IGFETs connected in series between the first pass terminal and the first output terminal;
    a second set of s IGFETs connected in series between the second pass terminal and the second output terminal; wherein for each m=1, 2, ... s, an $m^{th}$ IGFET belonging to the first set of s IGFETs has a gate connected to a gate of an $m^{th}$ IGFET belonging to the second set of s IGFETs so that both $m^{th}$ IGFETs are either ON or OFF in response to a control voltage $y_m$ applied to their gates;
    a first set of r IGFETs connected in parallel and having sources connected to the first output terminal; and
    a second set of r IGFETs connected in parallel and having sources connected to the second output terminal; wherein for each j=1, 2, ... r, a $j^{th}$ IGFET belonging to the first set of r IGFETs has a gate connected to a gate of a $j^{th}$ IGFET belonging to the second set of r IGFETs so that both $j^{th}$ IGFETs are either ON or OFF in response to a control voltage $x_m$;
    wherein, the pass cell provides the differential voltage $E_i$ if the drains of the second set of r IGFETs are at ground, the drains of the first set of r IGFETs are driven by a pulse voltage signal, and the control voltages $\{x_j, y_m: j=1, 2, \ldots r; m=1, 2, \ldots s\}$ are such that $$\sum_{j=1}^{r} x_j = \sum_{j=k}^{i-1} B[j] + \overline{B}[i]$$

and $$\prod_{m=1}^{s} y_m = B[i]\prod_{m=k}^{i-1}\overline{B}[m].$$

19. The priority encoder as set forth in claim 18, wherein k=i and s=r=1.
20. A method to priority encode an n-tuple B, the method comprising:
    providing to first and second pass terminals of a pass cell a differential voltage indicative of $$\sum_{j=0}^{k-1} B[j]; \text{ and}$$

providing control voltages to the pass cell so that the pass cell provides at first and second output terminals a differential voltage indicative of $$E_i = B[i]\prod_{j=0}^{i-1}\overline{B}[j]$$

for an i, where $0 \leq k \leq i < n$.

21. The method as set forth in claim 20, further comprising:
    providing a supply voltage; and
    providing a pulse voltage signal so that the voltage swings of the differential voltages are less than the supply voltage.
22. The method as set forth in claim 20, further comprising:
    providing a supply voltage; and
    providing the control voltages so that the voltage swings of the differential voltages are less than the supply voltage.
23. The method as set forth in claim 20, wherein thp pass cell comprises:
    a first set of s IGFETs coupled in series between the first pass terminal and the first output terminal to allow signal propagation from the first pass terminal to the first output terminal if the first set of s IGFETs are all ON;
    a second set of s IGFETs coupled in series between the second pass terminal and the second output terminal to allow signal propagation from the second pass terminal to the second output terminal if the second set of s IGFETs are all ON; wherein for each m=1, 2, ... s, an $m_{th}$ IGFET belonging to the first set of s IGFETs is coupled to an $m_{th}$ IGFET belonging to the second set of s IGFETs so that both $m^{th}$ IGFETs are either ON or OFF in response to a control voltage $y_m$;
    a first set of r IGFETs coupled in parallel to allow propagation of a pulse voltage signal to the first output terminal if any IGFET belonging to the first set of r IGFETs is ON; and
    a second set of r IGFETs coupled in parallel to drive the second output terminal to ground if any IGFET belonging to the second set of r IGFETs is ON; wherein for each j=1,2, ... r, a $j^{th}$ IGFET belonging to the first set of r IGFETs is coupled to a $j^{th}$ IGFET belonging to the second set of r IGFETs so that both $j^{th}$ IGFETs are either ON or OFF in response to a control voltage $x_m$;
    wherein the control voltages $\{x_j, y_m: j=1, 2, \ldots r; m=1, 2, \ldots s\}$ are such that $$\sum_{j=1}^{r} x_j = \sum_{j=k}^{i-1} B[j] + \overline{B}[i]$$

and $$\prod_{m=1}^{s} y_m = B[i]\prod_{m=k}^{i-1}\overline{B}[m].$$

24. The method as set forth in claim 23, further comprising:
    providing a supply voltage; and
    providing the pulse voltage signal so that the voltage swings of the differential voltages are less than the supply voltage.
25. The method as set forth in claim 23, further comprising:
    providing a supply voltage; and
    providing the control voltages so that the voltage swings of the differential voltages are less than the supply voltage.

* * * * *

UNITED STATES PATENT AND TRADEMARK OFFICE
CERTIFICATE OF CORRECTION

PATENT NO. : 6,385,631 B1
DATED : May 7, 2002
INVENTOR(S) : Chen et al.

It is certified that error appears in the above-identified patent and that said Letters Patent is hereby corrected as shown below:

Column 5,
Line 20, delete "302 hand 304" and insert -- 302 and 304 --.
Line 34, delete "314 and 316" and insert -- 314 and 316 --.

Column 7,
Line 64, delete "provides differential" and insert -- provides the differential --.

Column 18,
Line 12, delete "thp" and insert -- the --.

Column 22,
Line 36, delete "(PMOSFET 502" and insert -- (pMOSFET 502 --.

Signed and Sealed this

Seventeenth Day of September, 2002

Attest:

Attesting Officer

JAMES E. ROGAN
Director of the United States Patent and Trademark Office